United States Patent
Oami (10) Patent No.: US 7,170,940 B2
(45) Date of Patent: Jan. 30, 2007

(54) MOVING PICTURE ENCODING SYSTEM

(75) Inventor: Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 479 days.

(21) Appl. No.: 10/024,215

(22) Filed: Dec. 21, 2001

(65) Prior Publication Data

US 2002/0118752 A1 Aug. 29, 2002

(30) Foreign Application Priority Data

Dec. 26, 2000 (JP) .......................... 2000-395592

(51) Int. Cl.
*H04B 1/66* (2006.01)
(52) U.S. Cl. .............................. 375/240.12
(58) Field of Classification Search ... 375/240–240.26; 348/403.1; 382/236; H04B 1/66
See application file for complete search history.

(56) References Cited

U.S. PATENT DOCUMENTS

| | | | | |
|---|---|---|---|---|
| 5,426,463 | A * | 6/1995 | Reininger et al. ..... | 375/240.03 |
| 5,790,196 | A * | 8/1998 | Sun et al. .............. | 375/240.05 |
| 5,847,766 | A * | 12/1998 | Peak ...................... | 375/240.24 |
| 5,933,194 | A * | 8/1999 | Kim et al. ............... | 348/403.1 |
| 5,949,956 | A * | 9/1999 | Fukuda ........................ | 386/112 |
| 5,990,957 | A * | 11/1999 | Ryoo ...................... | 375/240.03 |
| 6,141,380 | A * | 10/2000 | Krishnamurthy et al. ...................... | 375/240.02 |
| 6,167,084 | A * | 12/2000 | Wang et al. ............ | 375/240.02 |
| 6,490,320 | B1 * | 12/2002 | Vetro et al. ............ | 375/240.08 |
| 6,650,705 | B1 * | 11/2003 | Vetro et al. ............ | 375/240.08 |
| 6,654,417 | B1 * | 11/2003 | Hui ........................ | 375/240.03 |
| 6,690,833 | B1 * | 2/2004 | Chiang et al. .............. | 382/236 |
| 6,819,712 | B2 * | 11/2004 | Kawashima et al. ... | 375/240.03 |

FOREIGN PATENT DOCUMENTS

JP 2000-50254 A 2/2000

OTHER PUBLICATIONS

International Organization for Standardization, ISO-IEC/JTC 1/SC29/WG11, Document AVC-49b, Version 2, Apr. 1993.
IEEE Transactions on Circuits and Systems for Video Technology, vol. 9, No. 1, Feb. 1999, pp. 186-199.
IEEE Transactions on Circuits and Systems for Video Technology, vol. 7, No. 1, Feb. 1997, pp. 246-250.

* cited by examiner

*Primary Examiner*—Tung Vo
(74) *Attorney, Agent, or Firm*—Sughrue Mion, PLLC (57) ABSTRACT

A moving picture encoding system capable of bit rate control, by which moving pictures are encoded while maintaining high quality even when there are substantial changes in the size of objects and the characteristics of texture is provided. A predictive area calculating parameter extracting means obtains a predictive area calculating parameter to describe a function that indicates temporal variations in the area based on the history of the area data of an object. Besides, a bit number model parameter calculating means finds a bit number model parameter to describe a parameter for a bit number model used in modeling the generated bit number per unit area. A target bit number calculating means estimates a predictive value of the generated bit number for the uncoded VOPs based on the predictive area calculating parameter and the predictive bit number calculating parameter, and accordingly, allocates the remaining allocatable bits to decide a target bit number for the next VOP to be encoded. A coding means encodes the VOP according to the target bit number.

22 Claims, 3 Drawing Sheets

F I G. 1 PRIOR ART

MOVING PICTURE ENCODING SYSTEM

BACKGROUND OF THE INVENTION

The present invention relates to a moving picture encoding system, in which a moving picture is encoded with respect to each object, or a moving picture is divided into plural sections and bit allocation for encoding is decided with respect to each section, in particular, relates to improvement in bit rate control.

DESCRIPTION OF THE RELATED ART

In encoding moving pictures, there is a system employed by Test Model 5 (hereinafter referred to as TM-5) of MPEG-2 (Moving Picture Experts Group, Phase 2) as a coding control system, in which the target bit number of each frame is determined based on the amount of available bits, and the number of bits generated for the frame is controlled so as to approximate the target number (manuscript: "March, 1993, ISO/IEC JTC 1/SC 29/WG 11/NO400").

Figure 1:
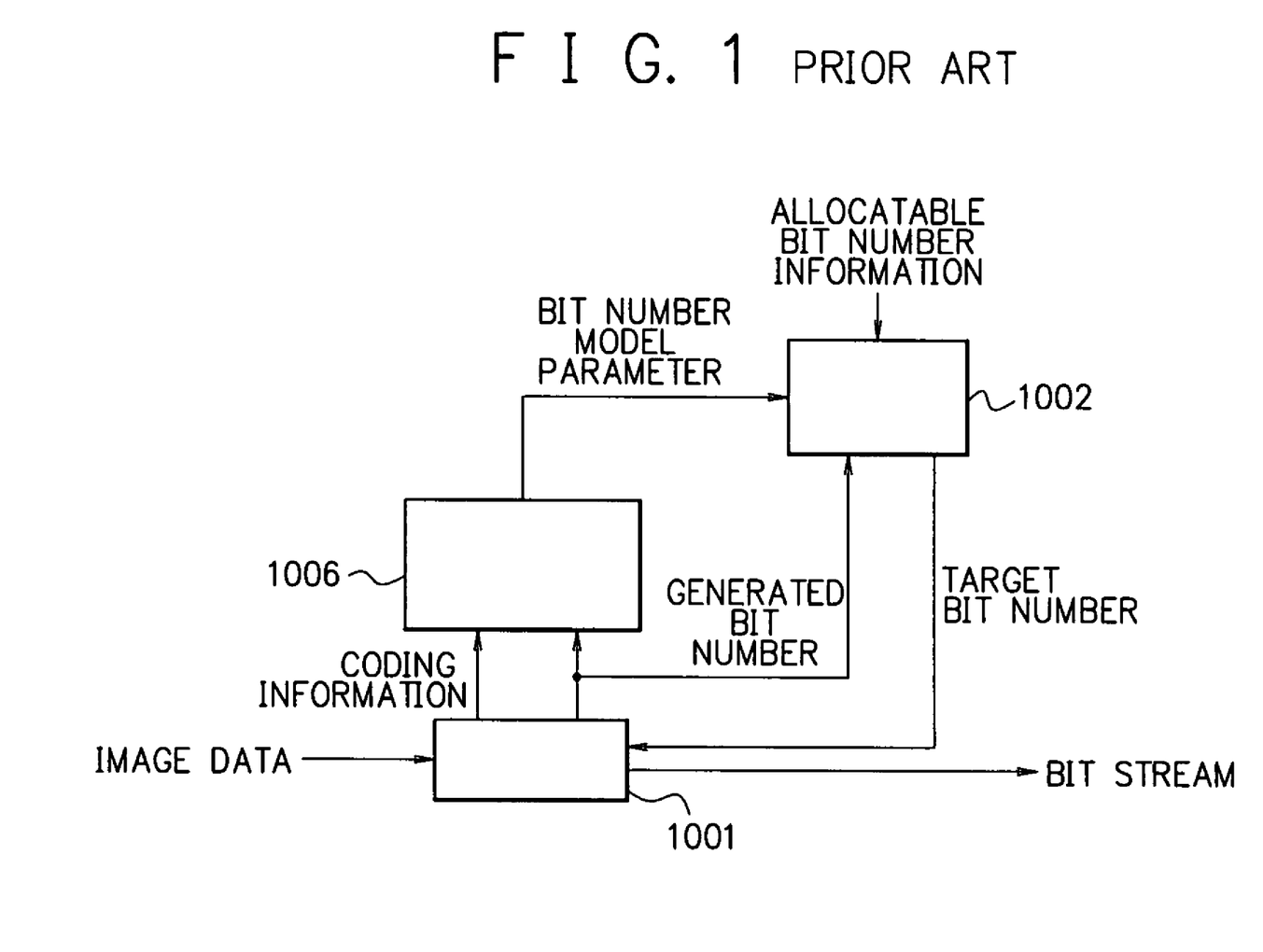
FIG. 1 is a block diagram showing a conventional moving picture encoding system.

FIG. 1 is a block diagram showing a conventional bit rate control scheme. The rate control scheme comprises a coding means 1001, a target bit rate calculating means 1002 and a bit number model parameter calculating means 1006. The coding means 1001 is supplied with image data and outputs of the target bit rate calculating means 1002, and outputs bit streams as the first output. Its second output (generated bit number) is sent to the target bit rate calculating means 1002 and the bit number model parameter calculating means 1006, and the third output (coding information) is sent to the bit number model parameter calculating means 1006. The bit number model parameter calculating means 1006, where the second and third outputs of the coding means 1001 are inputted, sends its output (bit number model parameter) to the target bit rate calculating means 1002. The target bit rate calculating means 1002 is supplied with the second output of the coding means 1001, the output of the bit number model parameter calculating means 1006 and available bits information, and sends its output (target bit number) to the coding means 1001.

In the coding means 1001, the inputted image data are encoded under the coding control so that the number of bits used for each frame meets the target supplied from the target bit rate calculating means 1002. Subsequently, the number of generated bits and coding information of each frame are outputted along with encoding results outputted as bit streams. Here, the coding information is quantization parameters used in encoding.

The bit number model parameter calculating means 1006 calculates parameters for modeling the bit number. In the system of TM-5, this parameter is a complexity index defined as a product of the generated bit number and the quantization parameter. Namely, assuming that: $X_I$, $X_P$, $X_B$; $S_I$, $S_P$, $S_B$; and $Q_I$, $Q_P$, $Q_B$ denote the complexity index, the number of generated bits, and the average value of the quantization parameter for each of I, P and B pictures, respectively, following expressions (1), (2) and (3) can be formed.

$$S_I = \frac{X_I}{Q_I} \tag{1}$$

$$S_P = \frac{X_P}{Q_P} \tag{2}$$

$$S_B = \frac{X_B}{Q_B} \tag{3}$$

Obtained complexity indexes $X_I$, $X_P$ and $X_B$ are outputted to the target bit rate calculating means 1002 as model parameters.

The target bit rate calculating means 1002 estimates the target bit number for each picture according to allocatable bit number information, the model parameter and the number of generated bits, and outputs the result to the coding means 1001. In MPEG-2, bit allocation is performed with respect to each GOP (Group Of Picture). First, the number of available bits for a GOP is found by the allocatable bit number information. Subsequently, the number of bits which have been used for coding the previous pictures in the GOP are deducted from the number of available bits to estimate the number of bits that are available for the remainder of the GOP (hereinafter referred to as R). After that, using predetermined constants $K_P$ and $K_B$, which indicate the roughness ratio in quantization of P and B pictures, the target bit number for the respective I, P and B pictures (hereinafter referred to as $T_I$, $T_P$ and $T_B$, respectively) is calculated by following expressions (4), (5) and (6).

$$T_I = \frac{R}{1 + \frac{X_P}{K_P X_I} N_P + \frac{X_B}{K_B X_I} N_B} \tag{4}$$

$$T_P = \frac{R}{N_P + \frac{X_B K_P}{X_P K_B} N_B} \tag{5}$$

$$T_B = \frac{R}{N_B + \frac{X_P K_B}{X_B K_P} N_P} \tag{6}$$

In (4), (5) and (6), $N_P$ and $N_B$ denote the number of P and B pictures that remain to be coded in the GOP. The target bit numbers are outputted to the coding means 1001, and used for rate control.

The above-mentioned rate control scheme does not involve object shape information since it is developed for MPEG-2. For MPEG-4, in which object-based encoding is performed, there are proposed schemes disclosed in Japanese Patent Application Laid-Open No. 2000-50254, and on page 186 to 199 of the document "IEEE Transactions on Circuits and Systems for Video Technology, Vol. CSVT-9, No. 1, February 1999". In the schemes, a second-order rate-distortion curve, which is described on page 246 to 250 of "IEEE Transactions on Circuits and Systems for Video Technology, Vol. CSVT-7, No. 1, February 1997", is employed. Namely, below expressions (7), (8) and (9) replace (1), (2) and (3) in modeling the number of bits.

$$S_I = \frac{X_I D}{Q_I} + \frac{Y_I D}{Q_I^2} \tag{7}$$

$$S_P = \frac{X_P D}{Q_P} + \frac{Y_P D}{Q_P^2} \tag{8}$$

$$S_B = \frac{X_B D}{Q_B} + \frac{X_B D}{Q_B^2} \quad (9)$$

In (7) to (9), D denotes the mean absolute difference (MAD) of a motion compensation predictive difference signal. Besides, $X_I$, $Y_I$, $X_P$, $Y_P$, $X_B$, $Y_B$ and D are the model parameters of bit quantity. The bit number model parameter calculating means 1006 calculates the values by a least squares estimation based on the values of the quantization parameters for past encoded frames, the MAD and the data on the number of generated bits. The calculation proceeds as follows: first, substitute expressions (10) and (11) for (8) and (9) to eliminate $Q_P$ and $Q_B$, and then, assuming that $S_I = T_I$, $S_P = T_P$ and $S_B = T_B$, substitute (7), (8) and (9) for (12) to achieve the value of $Q_I$. Thus, target bit numbers $T_I$, $T_P$ and $T_B$ for I, P and B frames are calculated.

$$Q_P = K_P Q_I \quad (10)$$

$$Q_B = K_B Q_I \quad (11)$$

$$T_I + N_P T_P + N_B T_B = R \quad (12)$$

In Japanese Patent Application Laid-Open No. 2000-50254, there is also disclosed a scheme, in which the bits for a frame estimated as above are allocated among a plurality of objects included in the frame. According to the scheme, the target bit number for a VOP (Video Object Plane) is determined by allocating bits for each object proportional to a weighting factor, which is the weighted average of the size, motion and activity of the object.

First, bit allocation for each frame is decided by using expression (13).

$$T = \sum_j \left\{ \alpha S_j + (1 - \alpha) \max\left(L, \frac{R}{mN}\right) \right\} \quad (13)$$

In (13), L indicates the number of bits required to assure a minimum quality. In addition, m denotes the number of objects, N denotes the number of frames which remain to be coded, $S_j$ denotes the number of bits generated for the j-th object of the previous frame, and α denotes a weighting factor. Here, a value of weighting factor α is 0.2. More specifically, remaining available bits R are allocated equally among VOPs, and then the allocation of each VOP is adjusted according to the number of bits generated in the previous coding. Thus, the total target bit number for objects included in a frame is estimated.

Next, the total target bit number T obtained by (13) is refined by buffer processing. After that, the total target bits T are allocated for each object according to the weight given by expression (14).

$$w_s \text{SIZE}_j + w_m \text{MOT}_j + w_v \text{MAD}_j^2 \quad (14)$$

In (14), $\text{SIZE}_j$, $\text{MOT}_j$ and $\text{MAD}_j$ indicate the size, motion vector, and MAD of the j-th object, respectively. Besides, $w_s$, $w_m$ and $w_v$ are weighting factors with values of: $w_s = 0.4$, $w_m = 0.6$ and $w_v = 0.0$, or $w_s = 0.25$, $w_m = 0.25$ and $w_v = 0.5$.

In the conventional rate control techniques, the bit rate is estimated with disregard to variations in the number of bits due to changing size of each object. In TM-5, this is not a problem since the size of a picture plane being subject to encoding stays unchanged. However, in object-based coding such as MPEG-4, when there is a sudden increase in object's size, bit allocation is not carried out successfully toward the end of a GOV (Group Of VOP) despite the substantial increase in the amount of generated bits. Consequently, picture quality is deteriorated, and encoding cannot be performed within the target bit number.

In the scheme disclosed in Japanese Patent Application Laid-Open No. 2000-50254, the object size information is taken into account by expression (14) on the occasion of allocating the total target bits for a frame among objects included in the frame. However, since the information is unconsidered at the point of determining the total target by expression (13), the same problems occur.

Moreover, in expression (13) of the above scheme for estimating the target bit number for each frame, it is assumed that the VOP rate of respective objects is uniform. Therefore, when there is difference in the frame rate among objects, the estimate of the target bit number for the frame is irrelevant.

Furthermore, in the rate control for video objects according to the above scheme, bits are allocated based on weight, which is given as the linear weighted sum of the size (area), motion and MAD of an object. The term of the MAD, however, is independent of the size of the object, and may give a large value even when the object is very small. Consequently, a large amount of bits are allocated for a small object when the value of its MAD is large. As a result, the number of bits to be allocated for other objects is reduced on the whole, which causes deterioration in the picture quality of the other objects.

SUMMARY OF THE INVENTION

It is therefore an object of the present invention to provide a moving picture encoding system capable of bit rate control, by which moving pictures are encoded while maintaining high quality even when there are substantial changes in the size of objects and the characteristics of texture.

Besides, it is another object of the present invention to provide a moving picture encoding system capable of bit rate control, by which bit allocation is performed properly even when the frame rate varies with each object.

In accordance with the first aspect of the present invention, there is provided a moving picture encoding system for encoding moving picture sequences with respect to each object, comprising: a coding means for encoding object picture data consisting of time series sequences of video object planes (VOPs), each of which is a picture image of at least one object at a point of time, and shape information data indicating the shape of the object in each VOP while conducting bit rate control so that the number of generated bits for each VOP meets a target bit number, and outputting coding information including a quantization parameter used in encoding and the generated bit number along with obtained bit streams; an area calculating means for calculating the area of the object in each VOP based on the shape information data, and outputting the result as area data; a predictive area calculating parameter extracting means for obtaining a function that indicates temporal variations in the area of the object based on the history of the area data, and outputting a parameter specifying the function or a predictive value of the area obtained by the function as a predictive area calculating parameter; a bit number model parameter calculating means for calculating a parameter used in modeling the generated bit number per unit area of the object based on the coding information, the generated bit number and the area data, and outputting the result as a bit number model parameter; a predictive bit number calculating parameter extracting means for obtaining a function that indicates temporal variations in the bit number model parameter based on the history of the bit number model parameter, and outputting a parameter specifying the function or a predictive value of the bit number model parameter obtained by the function as a predictive bit number calculating parameter; and a target bit number calculating means which performs a series of processes: calculating an uncoded VOP allocatable bit number that is the total number of allocatable bits for uncoded VOPs in a certain period of time based on allocatable bit number information indicating the total number of allocatable bits for the VOPs in the certain period of time and the number of generated bits for the encoded VOPs in the certain period of time, estimating the number of generated bits for the uncoded VOPs based on the predictive area calculating parameter and the predictive bit number calculating parameter, allocating the uncoded VOP allocatable bit number, calculating a target bit number for the next VOP to be encoded, and outputting the target bit number; sequentially for each of VOPs in the certain period of time.

In accordance with the second aspect of the present invention, there is provided a moving picture encoding system for encoding moving picture sequences with respect to each object, comprising: a storing means for temporarily storing object picture data consisting of time series sequences of video object planes (VOPs), each of which is a picture image of at least one object at a point of time, and shape information data indicating the shape of the object in each VOP; a coding means which reads the object picture data and shape information data out of the storing means, encodes the data while conducting bit rate control so that the number of generated bits for each VOP meets a target bit number, and outputs coding information including a quantization parameter used in encoding and the generated bit number along with obtained bit streams; an area calculating means for calculating the area of the object in each VOP based on the shape information data, and outputting the result as area data; a bit number model parameter calculating means for calculating a parameter used in modeling the generated bit number per unit area of the object based on the coding information, the generated bit number and the area data, and outputting the result as a bit number model parameter; a predictive bit number calculating parameter extracting means for obtaining a function that indicates temporal variations in the bit number model parameter based on the history of the bit number model parameter, and outputting a parameter specifying the function or a predictive value of the bit number model parameter obtained by the function as a predictive bit number calculating parameter; and a target bit number calculating means which performs a series of processes: calculating an uncoded VOP allocatable bit number that is the total number of allocatable bits for uncoded VOPs in a certain period of time based on allocatable bit number information indicating the total number of allocatable bits for the VOPs in the certain period of time and the number of generated bits for the encoded VOPs in the certain period of time, estimating the number of generated bits for the uncoded VOPs based on the area data and the predictive bit number calculating parameter, allocating the uncoded VOP allocatable bit number, calculating a target bit number for the next VOP to be encoded, and outputting the target bit number; sequentially for each of VOPs in the certain period of time.

In accordance with the third aspect of the present invention, there is provided a moving picture encoding system for encoding each frame of moving picture sequences while conducting bit rate control with respect to each section of the frame, comprising: a coding means which is supplied with picture data, section information data indicating the sections in each frame of the picture data and a target bit number for each section, encodes the data with respect to each section while conducting bit rate control so that the number of generated bits for each section meets the target bit number, and outputs coding information including a quantization parameter used in encoding and the generated bit number along with obtained bit streams; an area calculating means for calculating the area of the section in each frame based on the section information data, and outputting the result as area data; a predictive area calculating parameter extracting means for obtaining a function that indicates temporal variations in the area of the section based on the history of the area data, and outputting a parameter specifying the function or a predictive value of the area obtained by the function as a predictive area calculating parameter; a bit number model parameter calculating means for calculating a parameter used in modeling the generated bit number per unit area of the section based on the coding information, the generated bit number and the area data, and outputting the result as a bit number model parameter; a predictive bit number calculating parameter extracting means for obtaining a function that indicates temporal variations in the bit number model parameter based on the history of the bit number model parameter, and outputting a parameter specifying the function or a predictive value of the bit number model parameter obtained by the function as a predictive bit number calculating parameter; and a target bit number calculating means which performs a series of processes: calculating an uncoded frame allocatable bit number that is the total number of allocatable bits for uncoded frames in a certain period of time based on allocatable bit number information indicating the total number of allocatable bits for the frames in the certain period of time and the number of generated bits for the encoded frames in the certain period of time, estimating the number of generated bits for each section in the uncoded frames based on the predictive area calculating parameter and the predictive bit number calculating parameter, allocating the uncoded frame allocatable bit number, calculating a target bit number for each section in the next frame to be encoded, and outputting the target bit number; sequentially for each of frames in the certain period of time.

In accordance with the fourth aspect of the present invention, there is provided a moving picture encoding system for encoding each frame of moving picture sequences while conducting bit rate control with respect to each section of the frame, comprising: a storing means for temporarily storing picture data, section information data indicating the sections in each frame of the picture data; a coding means which reads the picture data and section information data out of the storing means, encodes the data with respect to each section while conducting bit rate control so that the number of generated bits for each section meets a target bit number for the section, and outputs coding information including a quantization parameter used in encoding and the generated bit number along with obtained bit streams; an area calculating means for calculating the area of the section in each frame based on the section information data, and outputting the result as area data; a bit number model parameter calculating means for calculating a parameter used in modeling the generated bit number per unit area of the section based on the coding information, the generated bit number and the area data, and outputting the result as a bit number model parameter; a predictive bit number calculating parameter extracting means for obtaining a function that indicates temporal variations in the bit number model parameter based on the history of the bit number model parameter, and outputting a parameter specifying the function or a predictive value of the bit number model parameter obtained by the function as a predictive bit number calculating parameter; and a target bit number calculating means which performs a series of processes: calculating an uncoded frame allocatable bit number that is the total number of allocatable bits for uncoded frames in a certain period of time based on allocatable bit number information indicating the total number of allocatable bits for the frames in the certain period of time and the number of generated bits for the encoded frames in the certain period of time, estimating the number of generated bits for each section in the uncoded frames based on the area data and the predictive bit number calculating parameter, allocating the uncoded frame allocatable bit number, calculating a target bit number for each section in the next frame to be encoded, and outputting the target bit number; sequentially for each of frames in the certain period of time.

In accordance with the fifth aspect of the present invention, there is provided a moving picture encoding method for encoding moving picture sequences with respect to each object, comprising the steps of calculating an uncoded VOP allocatable bit number that is the total number of allocatable bits for uncoded VOPs in a certain period of time by subtracting the number of generated bits for the encoded VOPs in the certain period of time from the total number of allocatable bits for the VOPs in the certain period of time, estimating the number of generated bits for all the uncoded VOPs, calculating a target bit number for the next VOP to be encoded by allocating the uncoded VOP allocatable bit number, and encoding the VOP; sequentially for each of VOPs in the certain period of time.

In accordance with the sixth aspect of the present invention, there is provided a moving picture encoding method for encoding each frame of moving picture sequences while conducting bit rate control with respect to each section of the frame, comprising the steps of calculating an uncoded frame allocatable bit number that is the total number of allocatable bits for uncoded frames in a certain period of time by subtracting the number of generated bits for the encoded frames in the certain period of time from the total number of allocatable bits for the frames in the certain period of time, estimating the number of generated bits for all the sections in the uncoded frames, calculating a target bit number for each section in the next frame to be encoded by allocating the uncoded frame allocatable bit number, and encoding the frame; sequentially for each of frames in the certain period of time.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Referring now to the drawings, a description of preferred embodiments of the present invention will be given in detail.

Figure 2:
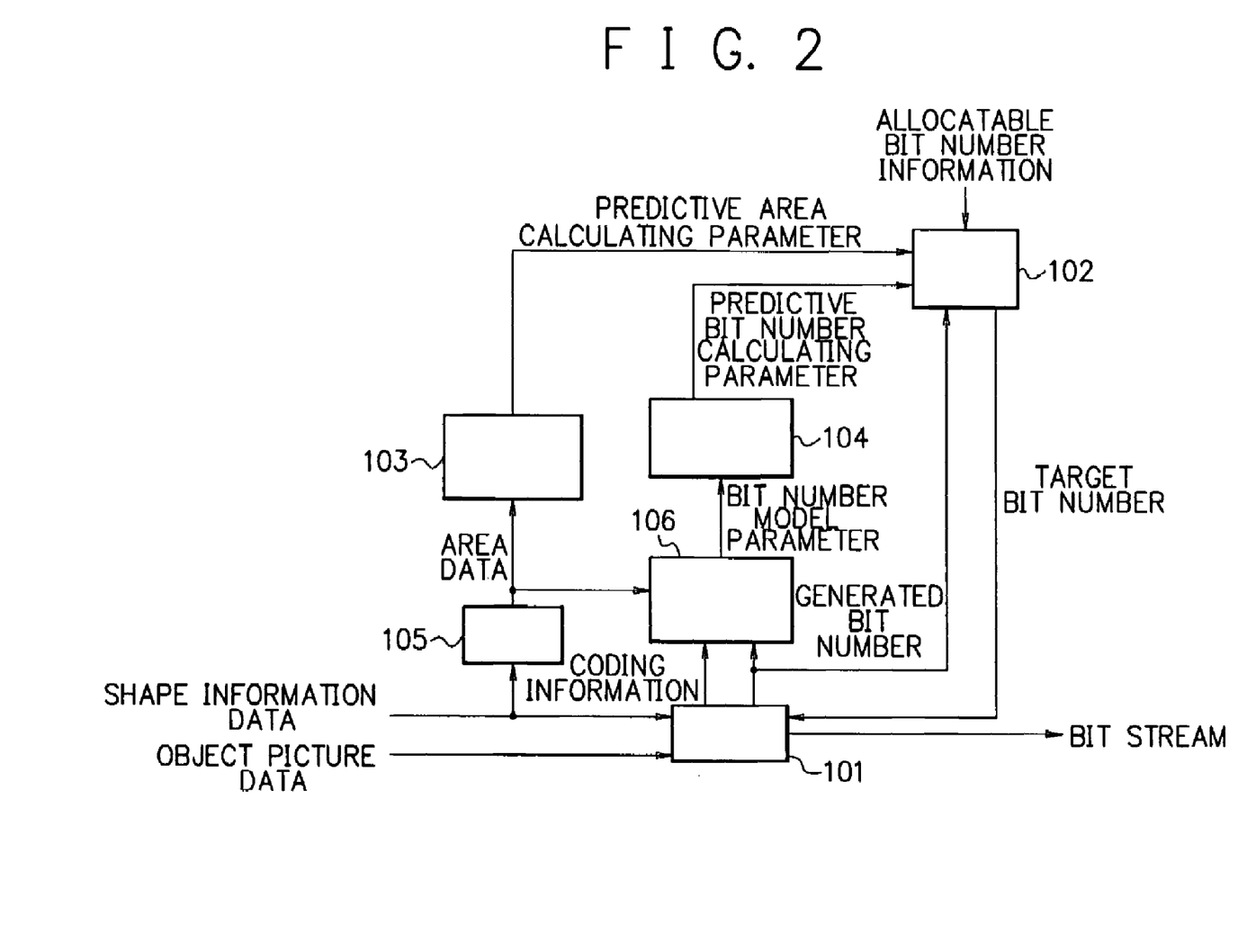
FIG. 2 is a block diagram showing a moving picture encoding system according to an embodiment of the present invention.

FIG. 2 is a block diagram showing a moving picture encoding system according to an embodiment of the present invention.

The moving picture encoding system comprises: a coding means 101, a target bit number calculating means 102, a predictive area calculating parameter extracting means 103, a predictive bit number calculating parameter extracting means 104, an area calculating means 105 and a bit number model parameter calculating means 106.

The coding means 101 is supplied with the output of the target bit number calculating means 102 (target bit number), shape information data and object picture data, and generates bit streams as the first output. Its second output (generated bit number) is provided to the target bit number calculating means 102 and the bit number model parameter calculating means 106, and the third output (coding information) is provided to the bit number model parameter calculating means 106.

The area calculating means 105 is supplied with the shape information data, and provides the predictive area calculating parameter extracting means 103 and the bit number model parameter calculating means 106 with its output (area data). The predictive area calculating parameter extracting means 103, which is supplied with the output of the area calculating means 105, provides the target bit number calculating means 102 with its output (predictive area calculating parameter).

The bit number model parameter calculating means 106, where the second and third outputs of the coding means 101, and the output of the area calculating means 105 are inputted, provides the predictive bit number calculating parameter extracting means 104 with its output (bit number model parameter).

The predictive bit number calculating parameter extracting means 104 is supplied with the output of the bit number model parameter calculating means 106, and provides the target bit number calculating means 102 with its output (predictive bit number calculating parameter). The target bit number calculating means 102, where allocatable bit number information, the second output of the coding means 101, and the outputs of the predictive area calculating parameter extracting means 103 and the predictive bit number calculating parameter extracting means 104 are inputted, provides the coding means 101 with its output (target bit number).

The shape information data indicate the shape of objects. A mask picture, in which, for example, object regions are shown with 255 pixels and the pixel value is set to 0 outside the object, corresponds to the data. The object picture data indicate a sequence of picture images of the object extracted from each frame.

The shape information data and the object picture data are inputted to the coding means 101, and encoded. The encoding of MPEG-4, for example, is applicable as a method of encoding. In this case, bit rate control is conducted so that the number of bits for each VOP (video object plane) meets a target bit number. After that, bit streams obtained by the encoding are outputted together with the generated bit number and the coding information.

The coding information is characteristic values found in encoding such as activity or motion compensation predictive difference power, the mean absolute difference (MAD) of a motion compensation predictive difference signal, the quantization parameter, and motion vector information.

The shape information is also inputted to the area calculating means 105. The area calculating means 105 calculates the area of an object region by counting pixels included in the object region according to the shape information. When the shape information is not binary but multivalued, the shape information is binarized before calculating the area. Alternatively, the area may be indicated by the number of blocks (macrobloks) including the object region instead of the number of pixels. The calculated area data are inputted to the predictive area calculating parameter extracting means 103 and the bit number model parameter calculating means 106.

The predictive area calculating parameter extracting means 103 finds a function approximate to the temporal variations of the object area based on the history of the area data supplied from the area calculating means 105. The predictive area calculating parameter extracting means 103 then outputs a parameter required to describe the function as a predictive area calculating parameter.

For example, the object area A(t) at the time t (or VOP number) in a VOP is approximated by n-th order expression (15).

$$A(t) = \sum_{j=0}^{n} p_j t^j \qquad (15)$$

In (15), parameter $p_j$ (j=0, ..., n) is the predictive area calculating parameter. These values are calculated by the least squares method etc. according to the values of the object area obtained in previous VOPs. Besides, the predictive area calculating parameter may be the actual predictive value of the object area in each VOP to be coded obtained by expression (15). In addition, it is also possible that the several types of functions are previously designated, and an index that specifies a function is outputted together with a parameter as the predictive area calculating parameter.

In this case, a function, which most approximates variations of the area, is found from among the designated types of functions, and a parameter thereof is obtained. Then, an index that indicates the type of the function and the parameter are outputted to the target bit number calculating means 102 as the predictive area calculating parameter.

On the other hand, the generated bit number and the coding information outputted from the coding means 101 are inputted to the bit number model parameter calculating means 106. The operation of the bit number model parameter calculating means 106 is basically the same as that of the bit number model parameter calculating means 1006, in which the relationship between the generated bit number and the coding information is expressed in a mathematical model, and a parameter to describe the model is calculated as a bit number model parameter. However, in the calculation of the bit number model parameter, the bit number model parameter calculating means 1006 models the number of bits for a whole picture plane, while the bit number model parameter calculating means 106 models the number of bits per unit area.

Consequently, the area data calculated by the area calculating means 105 are also inputted to the bit number model parameter calculating means 106 to be used in the calculation of the bit number model parameter. Incidentally, the model employed in the calculation is not restricted to the model obtained by (1) to (3), or (7) to (9), but the other models may be used.

Subsequently, the obtained model parameter is outputted to the predictive bit number calculating parameter extracting means 104.

The predictive bit number calculating parameter extracting means 104 finds a function approximate to the temporal variations of the model parameter based on the history of the bit number model parameter supplied from the bit number model parameter calculating means 106. The predictive bit number calculating parameter extracting means 104 then outputs a parameter required to describe the function as a predictive bit number calculating parameter.

For example, the bit number model parameter X(t) at the time t (or VOP number) in a VOP is approximated by n-th order expression (16).

$$X(t) = \sum_{j=0}^{n} q_j t^j \qquad (16)$$

In (16), parameter $q_j$ (j=0, ..., n) is the predictive bit number calculating parameter. These values are calculated by the least squares method etc. according to the values of the bit number model parameter obtained in previous VOPs. Besides, the predictive bit number calculating parameter may be the actual predictive value of the bit number model parameter in each VOP to be coded obtained by (16). In addition, it is also possible that the several types of functions are previously designated, and an index that specifies a function is outputted together with a parameter as the predictive bit number calculating parameter.

The predictive area calculating parameter outputted from the predictive area calculating parameter extracting means 103 and the predictive bit number calculating parameter outputted from the predictive bit number calculating parameter extracting means 104 are inputted to the target bit number calculating means 102. The target bit number calculating means 102 is also supplied with the allocatable bit number information and the generated bit number outputted from the coding means 101.

The target bit number calculating means 102 allocates allocatable bits in a certain period of time for each VOP in the certain period of time by using the predictive area calculating parameter and the predictive bit number calculating parameter, and thereby obtains the target bit number for each VOP. The number of allocated bits for each VOP is outputted as a target bit number from the target bit number calculating means 102.

The certain period of time corresponds a time interval taken for a GOV. When the bit rate control is executed with respect to each GOV, first, the number of available bits for a GOV is calculated based on the allocatable bit number information. A coding bit rate specified by a user, for example, is used as the allocatable bit number information. In this case, the number of available bits for a GOV is calculated by dividing the number of allocatable bits according to the information by a VOP rate, and then multiplying the quotient by the number of VOPs in the GOV.

Next, when there are VOPs, which have already been encoded, in the GOV, the number of bits used for encoding them is subtracted from the number of available bits for the GOV to find remaining available bits. Subsequently, the target bit number for the next VOP to be coded is calculated in consideration of the allocation of the available bits for remaining VOPs in the GOV.

In the following, the process of calculating target bit numbers $T_I$, $T_P$ and $T_B$ for I, P and B VOPs will be described using the bit number models obtained by (1) to (3). Incidentally, while (1) to (3) are applied to modeling the bit number for a whole picture plane in the above-mentioned conventional scheme, in this embodiment, (1) to (3) are applied to modeling the bit number per unit area.

Assuming that: the target bit number per unit area of I VOP is T, the time for I VOP is $t_I$, the area at time t is A(t), and the complexity indexes for I, P and B VOPs are $X_I(t)$, $X_P(t)$ and $X_B(t)$, respectively; target bit numbers $T_I$, $T_P$ and $T_B$ of the I, P and B VOPs at time t are expressed as follows:

$$T_I(t_I) = TA(t_I) \quad (17)$$

$$T_P(t) = \frac{X_P(t)}{X_I(t_I)K_P} TA(t) \quad (18)$$

$$T_B(t) = \frac{X_B(t)}{X_I(t_I)K_B} TA(t). \quad (19)$$

In (17), (18) and (19), $K_P$ and $K_B$ denote parameters to control the roughness of quantization for P and B pictures similarly to the system of TM-5. Assuming that the number of remaining available bits is R, expression (20), which is a generalized expression of (12), can be formed.

$$\sum_{t \in \tau_I} T_I(t) + \sum_{t \in \tau_P} T_P(t) + \sum_{t \in \tau_B} T_B(t) = R \quad (20)$$

In (20), $\tau_I$, $\tau_P$ and $\tau_B$ denote a set of time when the type of VOP is I, P and B, respectively, in the remaining VOPs included in a GOV. Incidentally, when there is no VOP of corresponding type in the remaining VOPs, each of $\tau_I$, $\tau_P$ and $\tau_B$ is a null set.

Thereby, the target bit number for I VOP at time $t_I$ can be expressed by expression (21). Similarly, the target bit numbers for P VOP at time $t_P$ and B VOP at time tB are calculated by following expression (22) and (23).

$$T_I(t_I) = \frac{X_I(t_I)A(t_I)R}{X_I(t_I)A(t_I) + \frac{1}{K_P}\sum_{t \in \tau_P} X_P(t)A(t) + \frac{1}{K_B}\sum_{t \in \tau_B} X_B(t)A(t)} \quad (21)$$

$$T_P(t_P) = \frac{X_P(t_P)A(t_P)R}{\sum_{t \in \tau_P} X_P(t)A(t) + \frac{K_P}{K_B}\sum_{t \in \tau_B} X_B(t)A(t)} \quad (22)$$

$$T_B(t_B) = \frac{X_B(t_B)A(t_B)R}{\sum_{t \in \tau_B} X_B(t)A(t) + \frac{K_B}{K_P}\sum_{t \in \tau_P} X_P(t)A(t)}. \quad (23)$$

In the target bit number calculating means 102, the values of the area and the complexity index concerning the remaining VOPs included in the GOV are calculated first using the predictive area calculating parameter and the predictive bit number calculating parameter. Then, the target bit number is calculated by an expression selected from (21) to (23) according to the type (I, P or B) of the next VOP to be coded using the obtained values of the area and the complexity index.

Besides, the quadratic bit number models shown by (7) to (9) may also be employed. In this case, functions that indicate the temporal variations of bit number model parameters $X_I$, $Y_I$, $X_P$, $Y_P$, $X_B$, $Y_B$ and D are found, and parameters to describe the functions are the predictive bit number calculating parameters. Incidentally, while (7) to (9) are applied to modeling the bit number for a whole picture plane in the above-mentioned conventional scheme, in this embodiment, (7) to (9) are applied to modeling the bit number per unit area. Calculation process is the same as the above case.

The calculated target bit number is inputted to the coding means 101, and used for encoding the next VOP.

In the above description, the target bit number is determined based on only the bit counts for texture, however, it may be determined in consideration of bits for motion and shape.

In this case, the coding means 101 counts the number of generated bits for the motion, shape and texture individually, and outputs the results as the generated bit number.

The bit number model parameter calculating means 106 calculates parameters for modeling the bit numbers for the motion and shape per unit area in addition to the bit number model parameter concerning the texture. The bit number model parameter concerning the motion/shape is simply calculated by dividing the bit number for the motion/shape by the area according to the area data supplied from the area calculating means 105, and outputted.

The predictive bit number calculating parameter extracting means 104 finds functions approximate to the temporal variations of the model parameters based on the history of the bit number model parameters concerning the motion and shape. The predictive bit number calculating parameter extracting means 104 then outputs parameters required to describe the functions as predictive bit number calculating parameters along with the bit number model parameter concerning the texture.

The target bit number calculating means 102 calculates the predictive amounts of the motion and shape bits per unit area for remaining VOPs by using the predictive bit number calculating parameters concerning the motion and shape. Subsequently, each result is multiplied by the predictive value of the area estimated according to the predictive area calculating parameter outputted from the predictive area calculating parameter extracting means 103, and thus the predictive numbers of the motion and shape bits are calculated. Then, the sum of the predictive values for the remaining VOPs is subtracted from the remaining allocatable bit number R, and the result is set anew as R in (21) to (23) to calculate the target bit number for the texture. Thus the bit rate control, in which the number of bits for the motion and shape are also taken into account, can be performed.

While in the above description, each object is encoded under the bit rate control individually, it is possible that plural objects are processed at the same time, and then the target bit rates for VOPs of each object are decided.

Assuming that the number of objects is J, the shape information data and object picture data supplied to the coding means shown in FIG. 2 are the data of J objects. Likewise there are the area data, the predictive area calculating parameter, the coding information, the generated bit number, the bit number model parameter, the predictive bit number calculating parameter, the target bit number, and the bit streams for each of the J objects. The coding means 101, the area calculating means 105, the predictive area calculating parameter extracting means 103, the bit number model parameter calculating means 106 and the predictive bit number calculating parameter extracting means 104 execute the above-mentioned processes for each of the J objects.

On the other hand, the target bit number calculating means 102 calculates the target bit number for the individual J objects based on the allocatable bit number, and the predictive area calculating parameter, the predictive bit number calculating parameter and the generated bit number for the individual J objects. In the following, the description will be given of the calculation procedure of the target bit number for each object in this case.

The quantization parameter for I VOP of the j-th object can be expressed as follows:

$$Q_{I,j} = M_j Q. \quad (24)$$

In (24), $Q_{I,j}$ denotes the quantization parameter for I VOP of the j-th object, and Q denotes the standard quantization parameter. The value of Q varies depending on the allocatable bit number. Besides, $M_j$ denotes the constant for adjusting the roughness of quantization. When $M_j$ is set to 1 for all objects, all the objects are quantized in the same roughness level. In other words, it is possible to make variations in the roughness of quantization among objects by the value. For example, quantization can be controlled so that visually important objects are quantized finely and the others are quantized roughly. In the following, the process of calculating the target bit number for each object based on Q set to accord with the allocatable bit number will be described.

The quantization parameters for P and B VOPs of the j-th object $Q_{P,j}$ and $Q_{B,j}$ are obtained by expressions (25) and (26) by using (24).

$$Q_{P,j} = K_{P,j} Q_{I,j} = K_{P,j} M_j Q \quad (25)$$

$$Q_{B,j} = K_{B,j} Q_{I,j} = K_{B,j} M_j Q \quad (26)$$

In (25) and (26), $K_{P,j}$ and $K_{B,j}$ denotes the ratio of the quantization parameters for P and B VOPs to the quantization parameter for I VOPs. Thereby the target bit numbers for I, P and B VOPs of the j-th object are defined by following expressions (27), (28) and (29), respectively.

$$T_{I,j}(t_I) = \frac{X_{I,j}(t)}{Q_{I,j}} A_j(t) = \frac{X_{I,j}(t)}{M_j Q} A_j(t) \quad (27)$$

$$T_{P,j}(t) = \frac{X_{P,j}(t)}{Q_{P,j}} A_j(t) = \frac{X_{P,j}(t)}{K_{P,j} M_j Q} A_j(t) \quad (28)$$

$$T_{B,j}(t) = \frac{X_{B,j}(t)}{Q_{B,j}} A_j(t) = \frac{X_{B,j}(t)}{K_{B,j} M_j Q} A_j(t). \quad (29)$$

Assuming that, $\tau_{I,j}, \tau_{P,j}$ and $\tau_{B,j}$ denote a set of time when a VOP is I, P and B VOP types, respectively, in remaining VOPs included in the GOV for the i-th object, expression (30) can be formed.

$$\sum_j \left( \sum_{t \in \tau_{I,j}} T_{I,j}(t) + \sum_{t \in \tau_{P,j}} T_{P,j}(t) + \sum_{t \in \tau_{B,j}} T_{B,j}(t) \right) = R \quad (30)$$

Incidentally, when there is no VOP of the above types in the remaining VOPs, each of $\tau_I$, $\tau_P$ and $\tau_B$ is a null set. By substituting (27) to (29) for (30) and solving Q, the expression (31) can be achieved.

$$Q = \frac{1}{R} \sum_j \frac{1}{M_j} \left( \sum_{t \in \tau_{I,j}} X_{I,j}(t) A_j(t) + \frac{1}{K_{P,j}} \sum_{t \in \tau_{P,j}} X_{P,j}(t) A_j(t) + \frac{1}{K_{B,j}} \sum_{t \in \tau_{B,j}} X_{B,j}(t) A_j(t) \right) \quad (31)$$

Further, by substituting (31) for (27) to (29), the expressions (32), (33) and (34) are obtained $$T_{I,k}(t_I) = \frac{X_{I,k}(t_I) A_k(t_I) R}{M_k \sum_j \frac{1}{M_j} \left( \sum_{t \in \tau_{I,j}} X_{I,j}(t) A_j(t) + \frac{1}{K_{P,j}} \sum_{t \in \tau_{P,j}} X_{P,j}(t) A_j(t) + \frac{1}{K_{B,j}} \sum_{t \in \tau_{B,j}} X_{B,j}(t) A_j(t) \right)} \quad (32)$$

$$T_{P,k}(t_P) = \frac{X_{P,k}(t_P) A_k(t_P) R}{K_{P,k} M_K \sum_j \frac{1}{M_j} \left( \sum_{t \in \tau_{I,j}} X_{I,j}(t) A_j(t) + \frac{1}{K_{P,j}} \sum_{t \in \tau_{P,j}} X_{P,j}(t) A_j(t) + \frac{1}{K_{B,j}} \sum_{t \in \tau_{B,j}} X_{B,j}(t) A_j(t) \right)} \quad (33)$$

$$T_{B,K}(t_B) = \frac{X_{B,k}(t_B) A_k(t_B) R}{K_{B,k} M_K \sum_j \frac{1}{M_j} \left( \sum_{t \in \tau_{I,j}} X_{I,j}(t) A_j(t) + \frac{1}{K_{P,j}} \sum_{t \in \tau_{P,j}} X_{P,j}(t) A_j(t) + \frac{1}{K_{B,j}} \sum_{t \in \tau_{B,j}} X_{B,j}(t) A_j(t) \right)} \quad (34)$$

Thus the target bit number for each object is calculated and outputted to the coding means.

As is described above, even when there are plural objects in a frame, bit allocation can be performed properly. Besides, the target bit numbers obtained by (32) to (34) are applicable to the case where the frame rate varies with each object.

Next, another embodiment of the present invention will be described referring to FIG. 3. This embodiment can be applied to the case where delay is admissible in encoding. Basically, the moving picture encoding system of this embodiment has the same configuration as that illustrated in FIG. 2 except that it does not include the predictive area calculating parameter extracting means 103 and is provided with a buffer 200.

In addition, a target bit number calculating means 202 and a bit number model parameter calculating means 206 replace the target bit number calculating means 102 and the bit number model parameter calculating means 106, respectively.

The buffer 200 is supplied with shape information data and object picture data, and its first output (shape information data) and the second output (object picture data) are sent to the coding means 101.

The area calculating means 105 is supplied with the shape information data before being inputted to the buffer 200, and its output (area data) is sent to the target bit number calculating means 202 and the bit number model parameter calculating means 206.

The target bit number calculating means 202 is provided with outputs of the predictive bit number calculating parameter extracting means 104 and the area calculating means 105, allocatable bit number information, and the second output of the coding means 101 (generated bit number), and its output is sent to the coding means 101. In other respects, the moving picture encoding system of this embodiment is the same as the system shown in FIG. 2.

The buffer 200 stores the inputted shape information data and the object picture data as long as a period of unitary time for the bit rate control (for example, a span of a GOV). The coding means 101 of this embodiment operates in the same manner as that in FIG. 2.

The operation of the bit number model parameter calculating means 206 is basically the same as that of the bit number model parameter calculating means 106 in FIG. 2, except that the bit number model parameter calculating means 206 stores the area data outputted from the area calculating means 105 for a certain period of time, and calculates the bit number model parameter by using the area data of a VOP corresponding to the generated bit number outputted from the coding means 101.

The target bit number calculating means 202 calculates the target bit number in the same manner as the target bit number calculating means 102 in FIG. 2. However, the target bit number calculating means 202 uses actual area data calculated previous to encoding by the area calculating means 105 for the calculation of the target bit number, while the target bit number calculating means 102 uses a predictive value of the area A(t) for the calculation.

The operation of other parts is the same as that of moving picture encoding means shown in FIG. 2.

Figure 3:
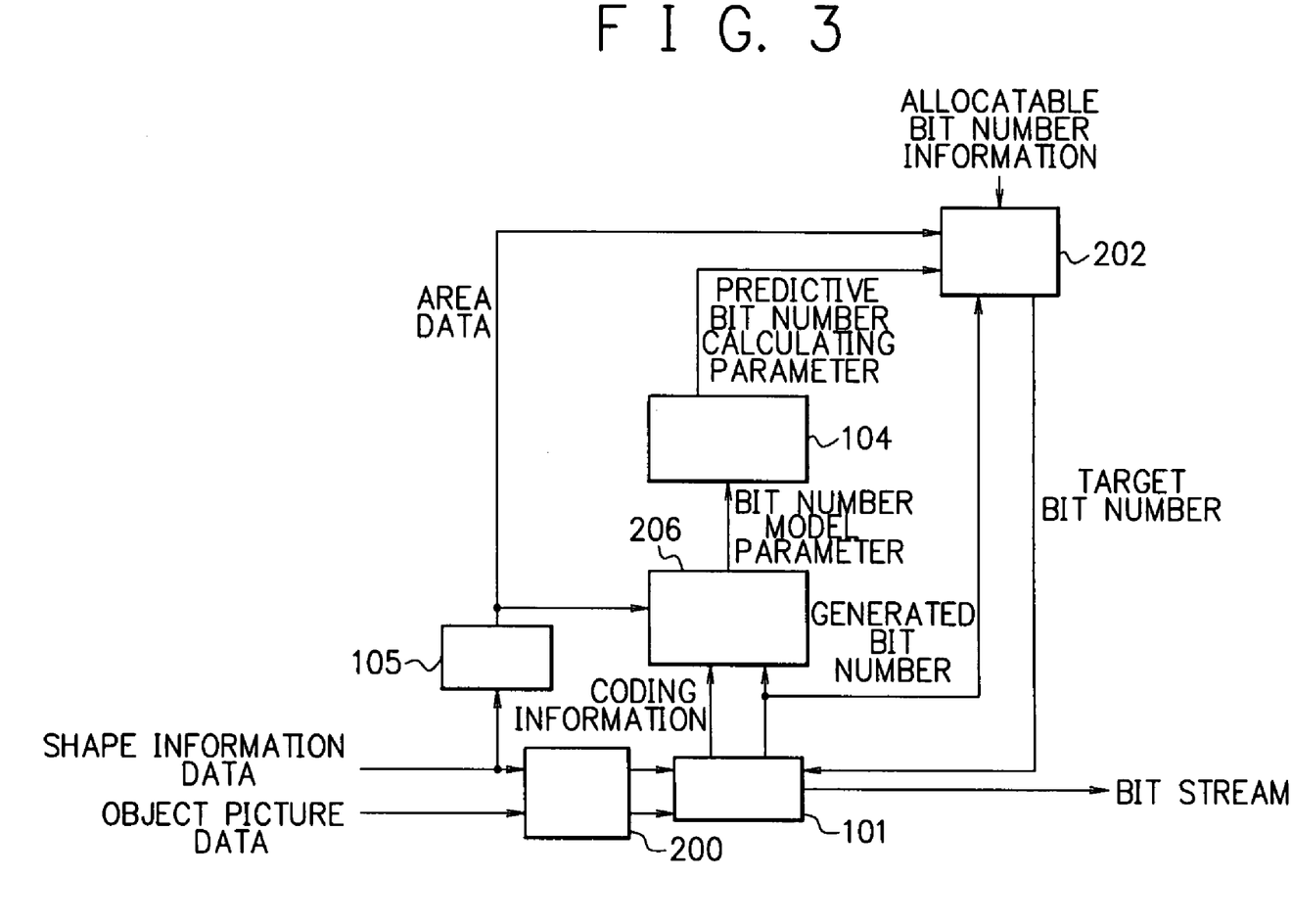
FIG. 3 is a block diagram showing a moving picture encoding system according to another embodiment of the present invention.

In the moving picture encoding system illustrated in FIG. 3, the target bit number calculating means 202 calculates the target bit number not by a predictive value of the area but by actual area data. Consequently, bit allocation can be performed with a higher degree of accuracy compared to the moving picture encoding system illustrated in FIG. 2.

While a description has been given of a system in which objects are encoded individually, the moving picture encoding system of the present invention is applicable to the bit allocation for encoding a frame that is a combination of objects without making a separation into each object. In this case, a frame is divided into sections for each object, and the bit rate control is performed with respect to each section. That is, coding model parameters are calculated for each section corresponding to an object, and thereby the target bit number for each section is calculated in the same manner as the above-mentioned calculation of the target bit number for each object. Thus, each section is encoded under the individual bit rate control according to the target bit number. On this occasion, it is not necessary to encode shape information. The shape information is used for the purpose of the bit rate control only.

Consequently, even when the area of a visually important object undergoes a lot of changes in a sequence, available bits can be allocated in a balanced manner. Besides, the moving picture encoding system of the present invention is also applicable to the case where a picture plane is divided into sections and the bit rate control is performed for each section to encode a sequence of frames not including plural separated objects. To take a screen of a picture phone as an example, the region carrying a picture of a person and the other regions are divided, and the target bit number is calculated likewise with respect to each region. Thus, it is made possible to perform the bit rate control according to the importance of each region.

Additionally, the moving picture encoding system according to the present invention may be implemented by reading a program for executing its operation stored in a storing medium such as a CD-ROM, a floppy disk or a nonvolatile memory card by a computer.

While the preferred embodiments of the present invention have been described using specific terms, such description is for illustrative purposes only, and it is to be understood that changes and variations may be made without departing from the spirit or the scope of the following claims.

What is claimed is:

1. A moving picture encoding system for encoding moving picture sequences with respect to each object, comprising:
    a coding means for encoding object picture data consisting of time series sequences of video object planes (VOPs), each of which is a picture image of the object at a point of time, and shape information data indicating the shape of the object in each VOP while conducting bit rate control so that the number of generated bits for each VOP meets a target bit number, and out-putting coding information including a quantization parameter used in encoding and the generated bit number along with obtained bit streams;
    an area calculating means for calculating the area of the object in each VOP based on the shape information data, and outputting the result as area data;
    a predictive area calculating parameter extracting means for obtaining a function that indicates temporal variations in the area of the object based on the history of the area data, and outputting a parameter specifying the function or a predictive value of the area obtained by the function as a predictive area calculating parameter;
    a bit number model parameter calculating means for calculating a parameter used in modeling the generated bit number per unit area of the object based on the coding information, the generated bit number and the area data, and outputting the result as a bit number model parameter;
    a predictive bit number calculating parameter extracting means for obtaining a function that indicates temporal variations in the bit number model parameter based on the history of the bit number model parameter, and outputting a parameter specifying the function or a predictive value of the bit number model parameter obtained by the function as a predictive bit number calculating parameter; and
    a target bit number calculating means which performs a series of processes: calculating an uncoded VOP allocatable bit number that is the total number of allocatable bits for multiple uncoded VOPs in a certain period of time, wherein said calculation is based on a total number of allocatable bits for VOPs in a time span equal to the certain period of time and based on the number of generated bits for encoded VOPs in the time span, estimating the number of bits to be generated for encoding the multiple uncoded VOPs based on the predictive area calculating parameter and the predictive bit number calculating parameter, allocating the uncoded VOP allocatable bit number, calculating a target bit number for the next VOP to be encoded, and outputting the target bit number, sequentially for each of VOPs in the certain period of time.

2. A moving picture encoding system for encoding moving picture sequences with respect to each object, comprising:
    a storing means for temporarily storing object picture data consisting of time series sequences of video object planes (VOPs), each of which is a picture image of the object at a point of time, and shape information data indicating the shape of the object in each VOP;
    a coding means which reads the object picture data and shape information data out of the storing means, encodes the data while conducting bit rate control so that the number of generated bits for each VOP meets a target bit number, and outputs coding information including a quantization parameter used in encoding and the generated bit number along with obtained bit streams;

an area calculating means for calculating the area of the object in each VOP based on the shape information data, and outputting the result as area data;

a bit number model parameter calculating means for calculating a parameter used in modeling the generated bit number per unit area of the object based on the coding information, the generated bit number and the area data, and outputting the result as a bit number model parameter;

a predictive bit number calculating parameter extracting means for obtaining a function that indicates temporal variations in the bit number model parameter based on the history of the bit number model parameter, and outputting a parameter specifying the function or a predictive value of the bit number model parameter obtained by the function as a predictive bit number calculating parameter; and a target bit number calculating means which performs a series of processes: calculating an uncoded VOP allocatable bit number that is the total number of allocatable bits for multiple uncoded VOPs in a certain period of time, wherein said calculation is based on a total number of allocatable bits for VOPs in a time span equal to the certain period of time and based on the number of generated bits for encoded VOPs in the time span , estimating the number of bits to be generated for encoding the multiple uncoded VOPs based on the area data and the predictive bit number calculating parameter, allocating the uncoded VOP allocatable bit number, calculating a target bit number for the next VOP to be encoded, and outputting the target bit number, sequentially for each of VOPs in the certain period of time.

3. The moving picture encoding system claimed in claim 1, wherein a moving picture sequence comprises a plurality of objects.

4. The moving picture encoding system claimed in claim 2, wherein a moving picture sequence comprises a plurality of objects.

5. A moving picture encoding system for encoding each frame of moving picture sequences while conducting bit rate control with respect to each section of the frame, comprising:

a coding means which is supplied with picture data, section information data indicating the sections in each frame of the picture data and a target bit number for each section, encodes the data with respect to each section while conducting bit rate control so that the number of generated bits for each section meets the target bit number, and outputs coding information including a quantization parameter used in encoding and the generated bit number along with obtained bit streams;

an area calculating means for calculating the area of the section in each frame based on the section information data, and outputting the result as area data;

a predictive area calculating parameter extracting means for obtaining a function that indicates temporal variations in the area of the section based on the history of the area data, and outputting a parameter specifying the function or a predictive value of the area obtained by the function as a predictive area calculating parameter;

a bit number model parameter calculating means for calculating a parameter used in modeling the generated bit number per unit area of the section based on the coding information, the generated bit number and the area data, and outputting the result as a bit number model parameter;

a predictive bit number calculating parameter extracting means for obtaining a function that indicates temporal variations in the bit number model parameter based on the history of the bit number model parameter, and outputting a parameter specifying the function or a predictive value of the bit number model parameter obtained by the function as a predictive bit number calculating parameter; and a target bit number calculating means which performs a series of processes: calculating an uncoded frame allocatable bit number that is the total number of allocatable bits for multiple uncoded frames in a certain period of time, wherein said calculation is based on a total number of allocatable bits for frames in a time span equal to the certain period of time and based on the number of bits for encoded frames in the time span, estimating the number of bits to be generated for encoding each section in the multiple uncoded frames based on the predictive area calculating parameter and the predictive bit number calculating parameter, allocating the uncoded frame allocatable bit number, calculating a target bit number for each section in the next frame to be encoded, and outputting the target bit number, sequentially for each of frames in the certain period of time.

6. A moving picture encoding system for encoding each frame of moving picture sequences while conducting bit rate control with respect to each section of the frame, comprising:

a storing means for temporarily storing picture data, section information data indicating the sections in each frame of the picture data;

a coding means which reads the picture data and section information data out of the storing means, encodes the data with respect to each section while conducting bit rate control so that the number of generated bits for each section meets a target bit number for the section, and outputs coding information including a quantization parameter used in encoding and the generated bit number along with obtained bit streams;

an area calculating means for calculating the area of the section in each frame based on the section information data, and outputting the result as area data;

a bit number model parameter calculating means for calculating a parameter used in modeling the generated bit number per unit area of the section based on the coding information, the generated bit number and the area data, and outputting the result as a bit number model parameter;

a predictive bit number calculating parameter extracting means for obtaining a function that indicates temporal variations in the bit number model parameter based on the history of the bit number model parameter, and outputting a parameter specifying the function or a predictive value of the bit number model parameter obtained by the function as a predictive bit number calculating parameter; and a target bit number calculating means which performs a series of processes: calculating an uncoded frame allocatable bit number that is the total number of allocatable bits for multiple uncoded frames in a certain period of time, wherein said calculation is based on a total number of allocatable bits for frames in time span equal to the certain period of time and based on the number of bits for encoded frames in the of time span, estimating the number of bits to be generated for encoding each section in the multiple uncoded frames based on the area data and the predictive bit number calculating parameter, allocating the uncoded frame allocatable bit number, calculating a target bit number for each section in the next frame to be encoded, and outputting the target bit number, sequentially for each of frames in the certain period of time.

7. The moving picture encoding system claimed in claim 1, wherein:
the bit number model parameter is a complexity index per unit area of the picture; and
the target bit number calculating means calculates the target bit number based on a product of a predictive value of the complexity index and a predictive value of the area data.

8. The moving picture encoding system claimed in claim 5, wherein:
the bit number model parameter is a complexity index per unit area of the picture; and
the target bit number calculating means calculates the target bit number based on a product of a predictive value of the complexity index and a predictive value of the area data.

9. The moving picture encoding system claimed in claim 2, wherein:
the bit number model parameter is a complexity index per unit area of the picture; and
the target bit number calculating means calculates the target bit number based on a product of a predictive value of the complexity index and the area data.

10. The moving picture encoding system claimed in claim 6, wherein:
the bit number model parameter is a complexity index per unit area of the picture; and
the target bit number calculating means calculates the target bit number based on a product of a predictive value of the complexity index and the area data.

11. The moving picture encoding system claimed in claim 1, wherein:
the bit number model parameter calculating means calculates the bit number model parameter with respect to each VOP type; and
the predictive bit number calculating parameter extracting means calculates the predictive bit number calculating parameter with respect to each VOP type.

12. The moving picture encoding system claimed in claim 2, wherein:
the bit number model parameter calculating means calculates the bit number model parameter with respect to each VOP type; and
the predictive bit number calculating parameter extracting means calculates the predictive bit number calculating parameter with respect to each VOP type.

13. The moving picture encoding system claimed in claim 5, wherein:
the bit number model parameter calculating means calculates the bit number model parameter with respect to each frame type; and
the predictive bit number calculating parameter extracting means calculates the predictive bit number calculating parameter with respect to each frame type.

14. The moving picture encoding system claimed in claim 6, wherein:

the bit number model parameter calculating means calculates the bit number model parameter with respect to each frame type; and
the predictive bit number calculating parameter extracting means calculates the predictive bit number calculating parameter with respect to each frame type.

15. The moving picture encoding system claimed in claim 3, wherein a constant which can make a variation in quantization fineness among objects is used when the target bit number is calculated.

16. The moving picture encoding system claimed in claim 4, wherein a constant which can make a variation in quantization fineness among objects is used when the target bit number is calculated.

17. The moving picture encoding system claimed in claim 5, wherein a constant which can make a variation in quantization fineness among sections is used when the target bit number is calculated.

18. The moving picture encoding system claimed in claim 6, wherein a constant which can make a variation in quantization fineness among sections is used when the target bit number is calculated.

19. A moving picture encoding method for encoding moving picture sequences with respect to each object, comprising the steps of:
calculating an uncoded VOP allocatable bit number, which is a total number of allocatable bits for multiple uncoded VOPs in a certain period of time subtracted by the number of generated bits for the encoded VOPs in a time span equal to the certain period of time;
estimating the number of bits to be generated for all the uncoded VOPs;
calculating a target bit number for a next VOP to be encoded by allocating the uncoded VOP allocatable bit number, wherein a constant which can vary quantization fineness across sections is used; and
encoding VOPs, sequentially for each of the uncoded VOPs in the certain period of time.

20. A moving picture encoding method for encoding each frame of moving picture sequences with respect to each section of the frame, while conducting bit rate control, comprising the steps of:
calculating an uncoded frame allocatable bit number, which is a total number of allocatable bits for multiple uncoded frames in a certain period of time, subtracted by the number of generated bits for the encoded frames in a time span equal to the certain period of time;
estimating the number of bits to be generated for all sections in the uncoded frames;
calculating a target bit number for each section in a next frame to be encoded by allocating the uncoded frame allocatable bit number, corresponding to multiple frames in the certain period of time, wherein a constant which can vary quantization fineness across sections is used
encoding the next frame; and
sequentially encoding each of the uncoded frames in the certain period of time.

21. A computer program stored in a computer readable medium executed by a computer to perform the moving picture.

22. A computer program stored in a computer readable medium executed by a computer to perform the moving picture encoding method claimed in claim 20.

* * * * *